United States Patent [19]
Maruyama et al.

[11] Patent Number: 5,088,768
[45] Date of Patent: Feb. 18, 1992

[54] STRUCTURE OF IMPACT ABSORBING STEERING APPARATUS

[75] Inventors: Tomoyuki Maruyama; Yoshiyuki Shimizu, both of Shizuoka, Japan

[73] Assignee: Fuji Kiko Company, Limited, Tokyo, Japan

[21] Appl. No.: 543,696

[22] Filed: Jun. 26, 1990

[30] Foreign Application Priority Data

Jun. 27, 1989 [JP] Japan ............................ 1-75333[U]
Aug. 31, 1989 [JP] Japan ............................ 1-102335[U]

[51] Int. Cl.⁵ ............................................. B62D 1/11
[52] U.S. Cl. ................................ 280/777; 280/779; 74/492
[58] Field of Search ................ 280/777, 779, 780; 74/492

[56] References Cited

U.S. PATENT DOCUMENTS

| | | | |
|---|---|---|---|
| 3,709,057 | 1/1973 | Kitzner et al. | 74/492 |
| 4,452,096 | 6/1984 | Workman | 74/492 |
| 4,733,575 | 3/1988 | Nakamura | 74/493 |

FOREIGN PATENT DOCUMENTS

| | | | |
|---|---|---|---|
| 0192776 | 8/1985 | European Pat. Off. | |
| 187545 | 7/1986 | European Pat. Off. | 74/492 |
| 245612 | 11/1987 | European Pat. Off. | 74/492 |
| 2365063 | 12/1973 | Fed. Rep. of Germany | |
| 52-55535 | 4/1977 | Japan | |
| 125963 | 6/1986 | Japan | 74/492 |
| 247268 | 10/1989 | Japan | 74/492 |
| 759381 | 9/1980 | U.S.S.R. | 74/492 |

Primary Examiner—Charles A. Marmor
Assistant Examiner—Tamara L. Finlay
Attorney, Agent, or Firm—Bachman & LaPointe

[57] ABSTRACT

A structure for a shock energy absorbing type steering apparatus is disclosed in which a column jacket in which a bracket member, rotatably fixed to a clamp, is attached to a vehicle body linked to a column jacket by means of welding and an enclosing body is extended in a space between the bracket member and clamp so as to enclose an upper surface area of the bracket member, thus preventing a foreign matter from invading into the inside of the bracket member. In addition, the bracket member includes a front wall to which the column jacket is perpendicularly fixed, curling portions formed on both side ends of the front wall, rollers inserted into the corresponding curling portions, and side walls extended from the curling portions in parallel to the column jacket, and cut-out portions formed on a portion of the bracket member below the curling portions. Furthermore, the bracket member includes projection portions located below the cut-out portions and engaged and penetrated through step portions of the clamp, the clamp member including pawl portions engaging bottom and front portions. Therefore, even if spot welded portions via which the bracket member and clamp are snapped due to shock generated by secondary collision, the projection portion and pawl portions serve to block the shock energy from being transmitted and prevent the bracket member from disengaging from the clamp. Shock energy is absorbed when the cut-out portions are torn off.

9 Claims, 2 Drawing Sheets

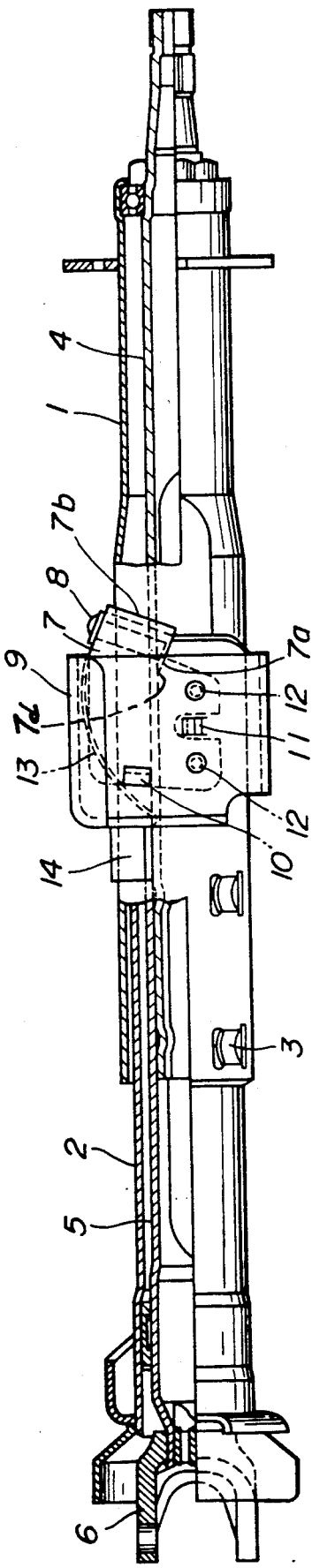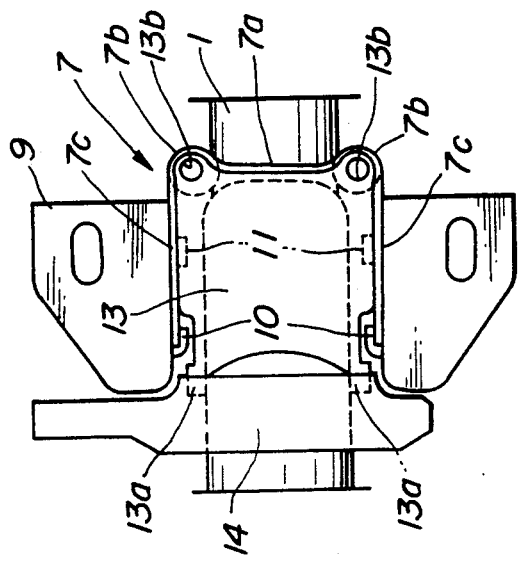

STRUCTURE OF IMPACT ABSORBING STEERING APPARATUS

BACKGROUND OF THE INVENTION

(1) Field of the Invention

The present invention relates to a structure of an impact absorbing steering apparatus for an automotive vehicle.

(2) Background of the Art

A steering apparatus generally includes a steering column having a steering bracket removably supporting a column jacket from a vehicle body, the column jacket being extendable and contractable in its axial direction so that a vehicle occupant can be protected from a secondary collision against the steering apparatus after collision with a moving or stationary obstacle.

In this case, the bracket has a U-shaped groove opened toward an upper end portion thereof and is fixed to the vehicle body by means of a bolt fitted into the groove. Therefore, if impact is received by the column jacket from the occupant, the bracket slides downward leaving the bolt. However, it is difficult for the column jacket to smoothly detach from the vehicle body in a case where shock from a direction other than the axial direction of the column is applied to the column jacket.

A Japanese Utility Model Registration First Publication No. Showa 52-55535 published on Apr. 20, 1977 (filed on Dec. 20, 1975) exemplifies a previously proposed structure of an impact absorbing steering apparatus in which a cut out portion in a substantially horizontal direction intersecting with the column jacket is previously formed on the bracket so that shock energy may be absorbed by tearing off the cut out portion when an excessive force is applied to the column jacket. Since secondary collision generates a force which pushes from the upper end portion of the column jacket toward the front of the vehicle body, the bracket linking the column jacket is supported on a clamp fixed to the vehicle body with merely a plurality of spot welded portions.

However, in the previously proposed structure of the steering apparatus disclosed in the above-identified Japanese Utility Model Registration First publication, the bracket may be detached from the clamp if the spot welded portions are snapped due to shock upon vehicle collision. At this time, the shock absorbing effect induced by the tearing off of the cut out portion is preempted and therefore of no benefit to the vehicle driver.

On the other hand, in another previously proposed steering apparatus, another steering column having the bracket, the bracket including a front wall to which the column jacket is perpendicularly fixed, a curl portion formed on both side ends of the front wall by bending thereof at a predetermined curvature, a roller inserted into the curl portion, both side portions extended in parallel to the column jacket from the curl portion, and cut out portions formed respectively on the both side portions. The bracket is fixed on a clamp fixed to the vehicle body. In a case where impact is received by the column jacket in the axial direction, the bracket generates curling and ripping so as to absorb the shock energy.

However, since in the above previously proposed steering apparatus a steering shaft and its universal joints are arranged within the jacket enclosing the clamp and bracket, the rotation of the steering shaft could be blocked or canceled by foreign matter (e.g., a bolt or coin placed on an instrument panel) slipping into the inside of the bracket or dropped thereinto.

Also, in the steering column in which curling and ripping are generated, foreign matter dropped into the bracket as described above could inhibit the curling and ripping action so that the shock energy cannot be absorbed.

SUMMARY OF THE INVENTION

It is, therefore, an object of the present invention to provide a structure of a steering apparatus which assures absorption of shock energy when a secondary collision occurs and which can suitably prevent foreign matter from being introduced thereinto.

The above-described object can also be achieved by providing a structure of a steering apparatus, comprising: a) a clamp portion fixed to a vehicle body; b) a bracket body fixed to the clamp portion and having a wall portion through which a column jacket, into which a steering shaft is coaxially housed, is linked; and c) an enclosing body enclosing an upper surface of the bracket body so that no foreign matter is received.

The above-described object can also be achieved by providing a structure of a steering apparatus, comprising: a) a clamp member fixed to a predetermined part of a vehicle body; b) a bracket member through which a steering shaft linked to a steering wheel is penetrated, the bracket member having a structure so as to absorb shock energy transmitted through the steering shaft; and c) an enclosing body placed in a space between the clamp member and bracket member so as to enclose an upper surface of the bracket member facing the vehicle body.

BRIEF DESCRIPTION OF THE DRAWINGS

FIG. 1 is a partially sectioned side view of a structure of a steering apparatus in a first preferred embodiment according to the present invention.

FIG. 2 is an elevation of an essential part of the steering apparatus shown in FIG. 1.

DETAILED DESCRIPTION OF THE PREFERRED EMBODIMENTS

Figure 3:
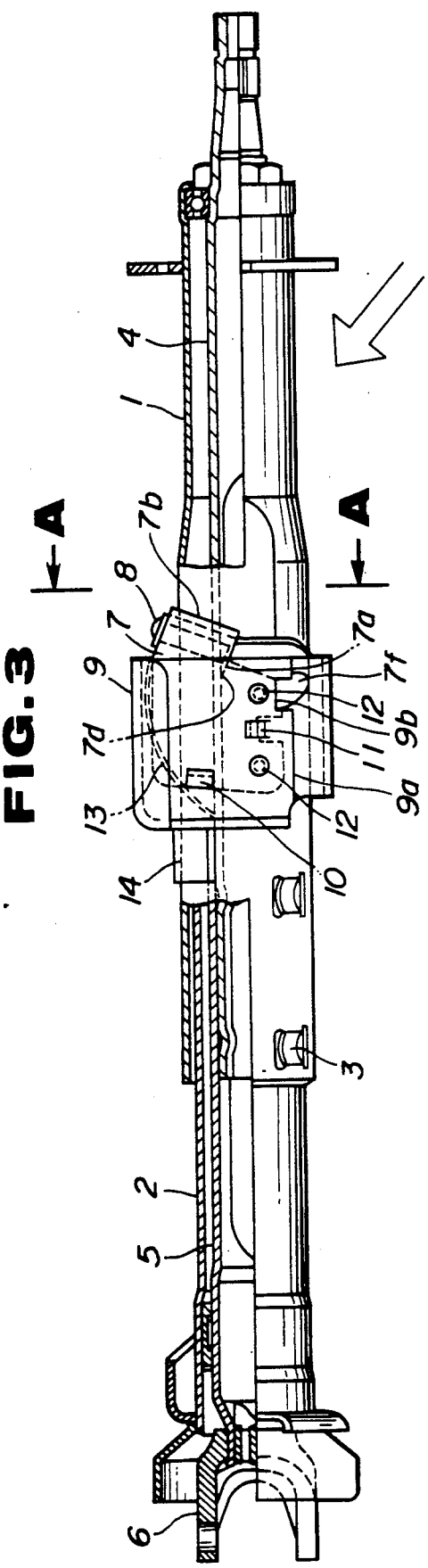
FIG. 3 is a partially sectioned side view of the structure of the steering apparatus in a second preferred embodiment according to the present invention.

Reference will hereinafter be made to the drawings in order to facilitate a better understanding of the present invention.

FIGS. 1 and 2 show a first preferred embodiment of a structure of a steering apparatus according to the present invention.

In FIGS. 1 and 2, an upper column jacket 1 and lower column jacket 2 are engaged so as to enable contraction in an axial direction via a pressure contact portion 3, the column jackets 1 and 2 being axially engaged with an upper steering shaft 4 and lower steering shaft 5 so as to enable contraction, the construction having a substantially elliptical cross section. A lower end of the lower shaft 5 is linked with an universal joint 6. A C-shaped bracket 7 is linked to the upper jacket 1 by means of welding with the upper jacket 1 perpendicularly intersecting the front wall 7a.

The front wall 7a of the bracket 7 contacts both side portions on which curl portions 7b, 7b are formed. Side portions 7c, 7c are formed extending parallel to each other along the upper jacket 1 and cut out portions 7d, 7d (refer to FIG. 1) are formed on the both side portions 7c, 7c. It is noted that rollers 8, 8 in flat head pin form are inserted under pressure into the curl portions 7b, 7b.

The bracket 7 has its front end portion engaged with a clamp 9 fixed to a vehicle body via a pawl portion 10 bent in a key form so as to project toward the inner portion of the bracket 7. The side portions 7c, 7c engage the clamp 9 via another pawl portion 11. In addition, the bracket 7 is fixed to the clamp 9 via spot welded portions 12, 12.

The clamp 9 is fixed to the vehicle body so as not to disengage from the vehicle body. As shown in FIG. 2, the bracket 7 is covered with an enclosing body 13 on the upper surface thereof. The front end portions 13a, 13a of the enclosing body 13 are projected in leg-like form and disposed so as to be bent wholly upward with the front end portions 13a, 13a of the enclosing body 13 inserted into the projection stop portion 14 of the lower column jacket 2. Holes 13b, 13b are fitted into the corner at the rear end thereof so as to insert the rollers 8, 8. The enclosing body 13 requires a soft and flexible material, a thin metal or a plastic such as chloroethylene for example.

An operation of the first preferred embodiment will be described below.

When a so-called secondary collision occurs, the weight of the vehicle driver is imposed on the steering wheel and the upper column jacket and upper shaft are moved downward in the axial direction. At this time, the curl portions 7b, 7b formed on the front walls 7a of the bracket 7 by which the movement of the clamp 9 is blocked absorbs the energy, curling via the rollers 8, 8 without change in curvature. Then, at the final stage, the cut out portions 7d, 7d are finally ripped. When the bracket 7 is broken, the shock energy can be absorbed. In addition, since the bracket 7 is completely covered with the enclosing body 13, foreign matter is blocked from the inside of the bracket 7 so that ill effects therefrom on the shock absorbing structure can completely be prevented. A hole 13b of the enclosing body 13 acts as a holder holding the roller 8. As a whole, the roller 8 is disposed so as to bend upward, the bracket 7 itself serves to act as a so-called play killer, such that, when the vehicle runs the bracket will not vibrate. Hence, abnormal sound can be prevented.

In the first preferred embodiment, the same effect can be generated even if the present invention is applied to a so-called tilt type steering column in which the bracket of a flat C-shaped type is rotatably pivoted to the clamp.

Figure 4:
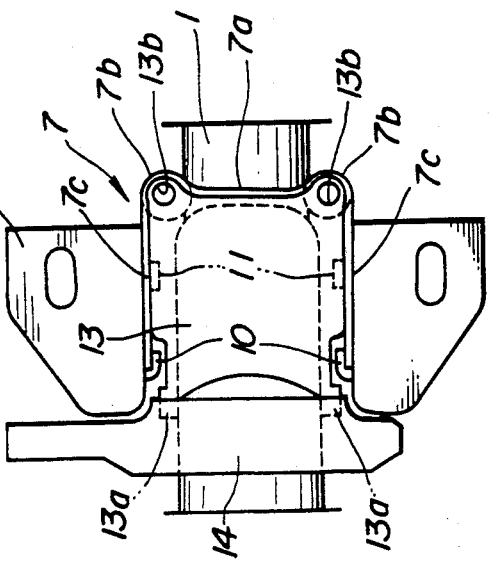
FIG. 4 is an elevation of the essential part of the steering apparatus shown in FIG. 3.
Figure 5:
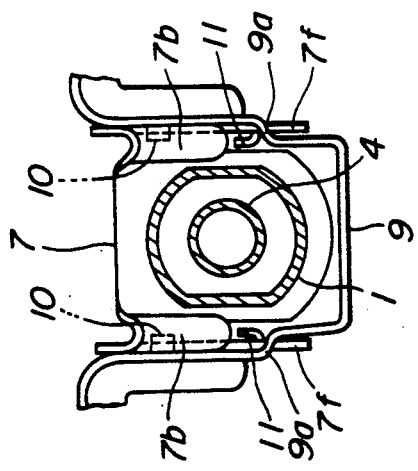
FIG. 5 is a partially omitted cross sectional view cut away along a line A—A of FIG. 3.

FIGS. 3 to 5 show a second preferred embodiment of the steering apparatus of the shock absorbing type according to the present invention.

In the second preferred embodiment, the projection portions 7f, 7f are penetrated through elongated holes 9b, 9b of step portions 9a, 9a formed on the clamp 9, projected toward the external side (as shown in FIG. 5), and linked to the clamp 9 by means of spot welded portions 12, 12.

In the second preferred embodiment, when the weight of the vehicle driver is imposed on the steering wheel so that the upper jacket 1 and upper shaft 4 receive the weight in the arrow marked direction of FIG. 3, the curl portions 7b, 7b of the front wall 7a of the bracket 7, the movement of which is blocked by the clamp 9, absorbs the energy, curling via the rollers 8, 8 without change in curvature. Finally, with the cut-out portions 7d, 7d ripped, the bracket 7 is broken so that the shock energy is absorbed. At this time, the bracket 7 receives the rotating force in the arrow-marked direction with the pawl portions 10, 10 as a fulcrum. Then, since the projection portions 7f, 7f engage the clamp 9 and engage the pawl portions 11, 11, they serve to block rotational force.

The other structure and operation are substantially the same as those in the first preferred embodiment.

As described hereinabove, since, in the steering apparatus according to the present invention, the enclosing body is installed so as to enclose the upper surface area of the bracket, the bracket being a flat C-shaped column jacket in which the steering shaft is coaxially housed, a dangerous state such that foreign matter is invaded into the bracket or inserted thereinto can be prevented. In addition, no influence on the curling and ripping action of the bracket itself, or rotation of the steering shaft can be achieved.

In addition, since the projection portions are installed on the lower part of the cut-out portions of the bracket and its projection portion is penetrated and engaged through the clamp and the pawl portions engaging the bottom portion and front portion of the bracket are formed on the clamp, the projection portions penetrating through the clamp prevent the spot welded portions from tearing off due to the shock of collision. Therefore, the bracket will not be separated from the clamp and the tearing off effect of the cut-out portions cannot be prevented.

It will fully be appreciated by those skilled in the art that the foregoing description is made in terms of the preferred embodiments and various changes and modifications may be made without departing from the scope of the present invention which is to be defined by the appended claims.

What is claimed is:

1. A structure for a steering apparatus comprising: a clamp portion fixed to a vehicle body; a bracket body which is substantially C-shaped in horizontal cross section fixed to the clamp portion and having a wall portion through which a column jacket is linked and into which a steering shaft is coaxially housed, wherein the bracket body includes side walls having spot welded portions respectively so as to link to the clamp portion, a cut out portion, and projecting portions located below the cut out portion, the projecting portion being penetrated through elongated holes of step portions formed on the clamp portion; wherein the wall portion includes curl portions located adjacent to the side walls, into which rollers are inserted, and the clamp portion includes pawl portions engaged with the side walls of the bracket body; an enclosing body enclosing an upper surface of the bracket body so that no foreign matter is received; and wherein the enclosing body has end portions inserted into a lower portion of a stop portion of the column jacket and includes holes through which the rollers are inserted into the curl portions.

2. A structure as set forth in claim 1, wherein the enclosing body is of a soft, flexible material.

3. A structure as set forth in claim 2, wherein the soft, flexible material is chloroethylene.

4. A structure as set forth in claim 1, wherein each of the rollers comprises a flat head type pin.

5. A structure as set forth in claim 4, wherein each of the projecting portions of the bracket body is placed below one of he spot welded portions.

6. A structure as set forth in claim 5, wherein the bracket body is axially attached to the clamp portion.

7. A structure for a steering apparatus, comprising: a clamp portion fixed to a vehicle body; a bracket body fixed to the clamp portion and having a wall portion through which a column jacket is linked and into which a steering shaft is coaxially housed, said bracket body also having side walls; wherein the wall portion includes curl portions located adjacent to the side walls, into which rollers are inserted, and the clamp portion includes pawl portions engaged with the side walls of the bracket body.

8. A structure for a steering apparatus, comprising: a clamp member fixed to a predetermined part of a vehicle body; a bracket member through which a steering shaft linked to a steering wheel is penetrated, the bracket member having a structure so as to absorb shock energy transmitted through the steering shaft, said bracket member having side and front portions; an enclosing body placed in a space between the clamp member and bracket member so as to enclose an upper surface of the bracket member facing the vehicle body; and further including sot welded portions located at side portions of the bracket member and a plurality of engaging members placed on respective side and front portions of the bracket and clamp members so as to engage the bracket member with the clamp member.

9. A structure as set forth in claim 8, wherein the plurality of engaging members includes projecting portions of the bracket member penetrated through holes of the clamp member and pawl portions formed on the clamp member so as to engage with bottom and front portions of the bracket member.

* * * * *